US012744657B2

(12) United States Patent
Refael Kalim et al.

(10) Patent No.: US 12,744,657 B2
(45) Date of Patent: Sep. 22, 2026

(54) HYBRID MACHINE LEARNING MODEL ENVIRONMENT WITH HOMOMORPHIC ENCRYPTION

(71) Applicant: Microsoft Technology Licensing, LLC, Redmond, WA (US)

(72) Inventors: Yehonathan Refael Kalim, Herzeliya (IL); Adam Hakim, Shoham (IL); Nishanth Chandran, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 73 days.

(21) Appl. No.: 18/635,279

(22) Filed: Apr. 15, 2024

(65) Prior Publication Data

US 2025/0323777 A1 Oct. 16, 2025

(51) Int. Cl.
*H04L 9/00* (2022.01)

(52) U.S. Cl.
CPC .................................... *H04L 9/008* (2013.01)

(58) Field of Classification Search
CPC ................................ H04L 9/008; G06N 3/045
See application file for complete search history.

(56) References Cited

U.S. PATENT DOCUMENTS 11,948,059 B2 * 4/2024 Zhang .................. G06F 21/606
12,388,799 B1 * 8/2025 Storm .................... G06F 17/16
2022/0156550 A1 * 5/2022 Zhang .................. G06F 21/606
2022/0414432 A1 * 12/2022 Banitalebi Dehkordi .................. G06N 3/08
2023/0047478 A1 * 2/2023 Brito ...................... G06N 3/084
2024/0154942 A1 * 5/2024 Gharibi ............... H04L 63/0428
2024/0256850 A1 * 8/2024 Soceanu ................ H04L 9/008
2024/0311631 A1 * 9/2024 Bycroft .................. G06N 3/045
2025/0202679 A1 * 6/2025 Huang .................. G06N 3/096
2025/0321746 A1 * 10/2025 Hoban ................. G06F 9/4401

OTHER PUBLICATIONS

Huang et al., "Secure Neural Network Prediction in the Cloud-Based Open Neural Network Service", IEEE Transactions on Services Computing, vol. 17, No. 2, Apr. 2024, pp. 659-673.
International Search Report and Written Opinion received for PCT Application No. PCT/US2025/015160, May 15, 2025, 15 pages.
Extended European Search Report Received in European Patent Application No. 25169820.5 mailed on Sep. 26, 2025, 11 pages.

(Continued)

*Primary Examiner* — Meng Li
(74) *Attorney, Agent, or Firm* — Shook Hardy & Bacon L.L.P.

(57) ABSTRACT

The technology described herein is related to a hybrid neural network that divides operations of a neural network layer between a server and a client device. In an aspect, one or more liner operations of a neural network layer are performed on the client, while non-linear operations, such as an activation function, are performed on the server. In an aspect, the technology described herein maintains network security by encrypting portions of the client-side components. The encrypted portions may be learned values, which may also be described as learned parameters. In aspects, homomorphic encryption is used.

20 Claims, 7 Drawing Sheets

(56) References Cited

OTHER PUBLICATIONS

Rafeal, et al., "SLIP: Securing LLMs IP Using Weights Decomposition", In repository of arXiv:2407.10886v1, Jul. 15, 2024, 28 Pages.
Samragh, et al., "Unsupervised Information Obfuscation for Split Inference of Neural Networks", In repository of arXiv:2104.11413v2, Jun. 23, 2021, 15 Pages.
International Search Report and Written Opinion received for PCT Application No. PCT/US2026/010514, mailed on Apr. 24, 2026, 17 pages.

* cited by examiner

600

TRAIN A NEURAL NETWORK TO FORM A TRAINED NEURAL NETWORK 610

FOR A FIRST LAYER OF THE TRAINED NEURAL NETWORK, ENCRYPT NEURON WEIGHTS TO FORM A PLURALITY OF ENCRYPTED WEIGHTS 620

GENERATE A FIRST PARTIAL LAYER OF A PARTIAL CLIENT-SIDE NEURAL NETWORK, WHEREIN THE FIRST PARTIAL LAYER COMPRISES THE PLURALITY OF ENCRYPTED WEIGHTS 630

DEPLOY THE FIRST PARTIAL LAYER OF THE PARTIAL SERVER-SIDE NEURAL NETWORK TO A PRODUCTION SERVER 640

GENERATE, FROM AN ACTIVATION FUNCTION, A FIRST PARTIAL LAYER OF A PARTIAL SERVER-SIDE NEURAL NETWORK 650

DEPLOY THE FIRST PARTIAL LAYER OF THE PARTIAL SERVER-SIDE NEURAL NETWORK TO A PRODUCTION SERVER 660

FIG. 6

HYBRID MACHINE LEARNING MODEL ENVIRONMENT WITH HOMOMORPHIC ENCRYPTION

CROSS-REFERENCE TO RELATED APPLICATIONS

None.

BACKGROUND

Neural networks are a key component of artificial intelligence and are used in a wide range of applications, from image recognition to natural language processing. Large neural networks (NNs), such as large language models (LLMs) have been widely adopted, both in academia and in the industry. A LLM is a type of artificial intelligence model that has been trained on a vast amount of text data. It may learn to predict the next word in a sentence by understanding the context provided by the preceding words. This ability allows it to generate human-like text, given some initial input. LLMs, such as a Generative Pre-training Transformer (GPT) model, may have billions of parameters that are fine-tuned during training, enabling them to capture complex patterns in language use. They can answer questions, write essays, summarize texts, translate languages, and even generate code. However, their increasing model complexity, manifested through billions to trillions of parameters, has presented significant challenges for their deployment and execution.

One major challenge stems from the growing interest to deploy NNs on edge computing devices. When deployed in a server, the NN may be secured from theft. The learned parameters of the NN may not be easily inspected or analyzed by users. In contrast, a NN deployed to a client may be inspected or copied. Deploying a NN to a less trusted and less secure environment presents critical security risks for this valuable intellectual property to be stolen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein is related to a hybrid neural network that divides operations of a neural network layer between a server and a client device. In an aspect, one or more liner operations of a neural network layer are performed on the client, while non-linear operations, such as an activation function, are performed on the server. In an aspect, the technology described herein maintains network security by encrypting portions of the client-side components. The encrypted portions may be learned values, which may also be described as learned parameters.

The technology described herein effectively splits operations associated with a single neuron between a server and a client. This creates a partial neuron on the client and a partial neuron on the server. Both the client-side portion and server-side portion need to cooperate to perform the functions associated with a single neuron. The cooperation includes routing the output from the client-side portion over a network to the server-side portion. The output from the server-side portion may then be routed to the next client-side portion of a subsequent layer.

In aspects, all neurons in a layer may be split between the client and server in the same manner. For example, the linear multiplication of an input to a neuron with a learned weight associated with the neuron may be performed on the client. Similarly, the addition of a bias to the product of the input and weight may be performed on the client. The result of the client-side operation, which may be described as an intermediate result, is communicated to the server, where a non-linear activation function may be performed on the intermediate result to produce an output from the neuron. Thus, the client portion of the neural network and the server portion of the neural network work together to generate the final output from a single neural-network layer.

In aspects, the parameters (e.g., weight and bias) used in the linear operations are encrypted at the server before deployment to the client. The encryption prevents the learned parameters from being accessed at the client. If the parameters were not encrypted, the parameters could be used by a different entity as a starting point to train their own model or simply to build their own model without training.

In aspects, homomorphic encryption is used. Homomorphic encryption is a form of encryption that allows computations to be performed on encrypted data without first having to decrypt it. This means that data can be processed while it remains in an encrypted, secure state. The resulting computations are left in an encrypted form which, when decrypted, result in an output that is identical to that produced had the operations been performed on the unencrypted data. In aspects, all numbers in a calculation are encrypted using the same homomorphic encryption method and encryption key.

BRIEF DESCRIPTION OF THE DRAWINGS

The technology described herein is illustrated by way of example and not limitation in the accompanying figures in which like reference numerals indicate similar elements and in which:

FIG. 6 is a flow diagram showing a method of using a hybrid neural network, in accordance with an aspect of the technology described herein.

DETAILED DESCRIPTION

Figure 1:
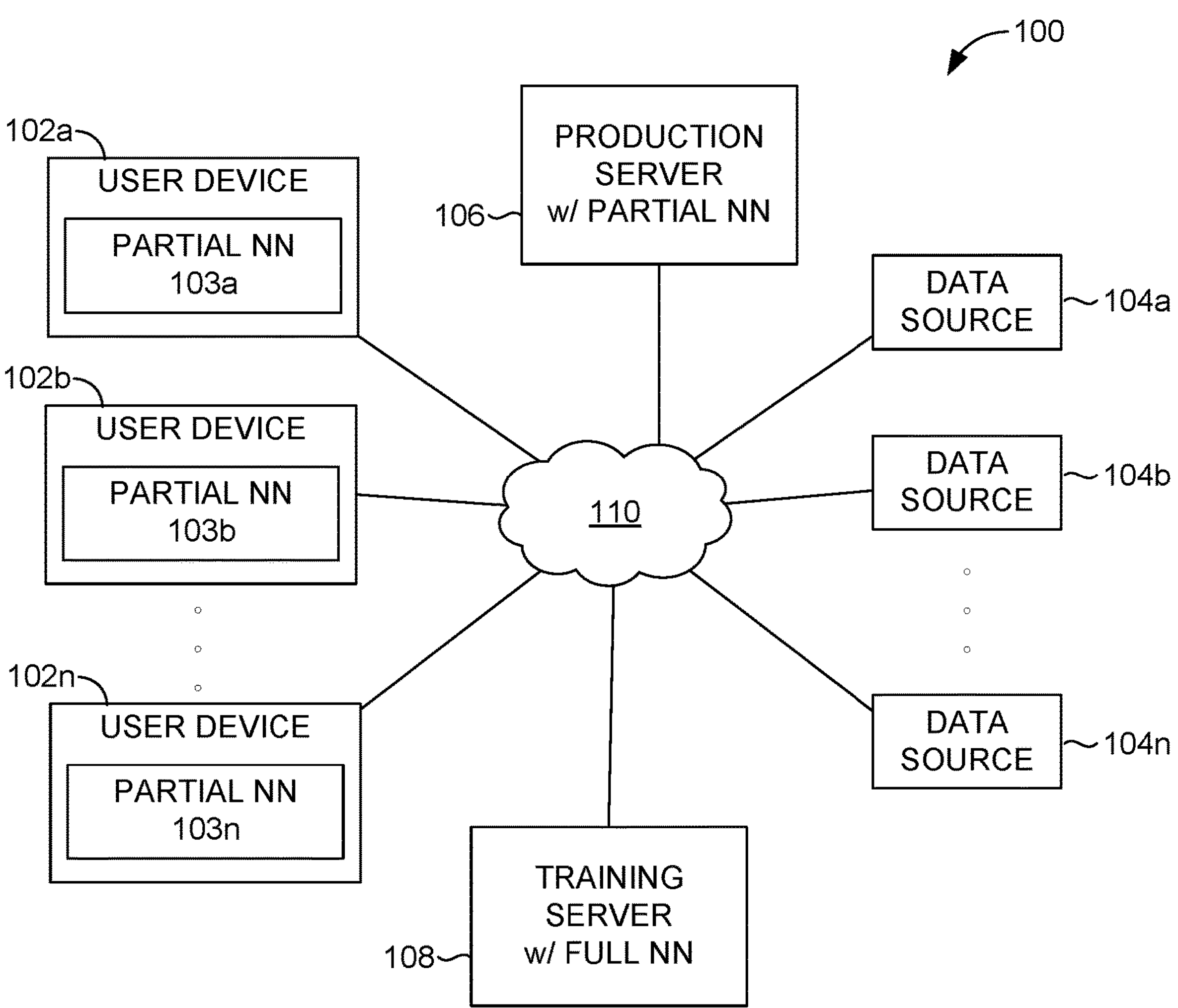
FIG. 1 is a diagram of a computing system suitable for implementations of the technology described herein.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein is related to a hybrid neural network that divides operations of a neural network layer between a server and a client device. In an aspect, one or more liner operations of a neural network layer are performed on the client, while non-linear operations, such as an activation function, are performed on the server. In an aspect, the technology described herein maintains network security by encrypting portions of the client-side components. The encrypted portions may be learned values, which may also be described as learned parameters.

Operating some neural networks, such as large language models, is resource intensive. The resources used include processing capacity, computer memory, and electricity. The use of client resources to run the neural networks may reduce the need build out larger data centers. However, deploying a trained neural network to the client may essentially give away the valuable neural network. It is desirable to utilize client resources to operate a neural network without giving away the trained neural network. The technology described herein utilizes a hybrid deployment with some neural network functions performed on a server and some on the client. In order to prevent theft of the trained neural network, some or all of the parameters deployed to the client are encrypted. Further, the client may not be given the encryption key. The technology described herein allows the client resources to be utilized for operation of a neural network without exposing the trained parameters of the neural network.

A neural network is a computational model that consists of layers of nodes, or "neurons," each receiving input, processing it, and passing the output to the next layer. Neural networks can include different types of layers. Example layer types include convolutional, activation, pooling, fully connected, batch normalization, dropout, recurrent layers, feedforward layers, embedding layers, and attention layers. Some of these layers perform a combination of liner operations and non-linear operations. For example, a neuron may use a non-linear activation function (e.g., ReLU, sigmoid, tanh) on the product of multiplying an input vector with a weight, where the weight is a learned parameter. This multiplication operation is linear. In some aspects, a bias may be added to the product. The addition of the bias is also a liner operation.

The technology described herein effectively splits operations associated with a single neuron between a server and a client. This creates a partial neuron on the client and a partial neuron on the server. Both the client-side portion and server-side portion need to cooperate to perform the functions associated with a single neuron. The cooperation includes routing the output from the client-side portion over a network to the server-side portion. The output from the server-side portion may then be routed to the next client-side portion of a subsequent layer.

In aspects, all neurons in a layer may be split between the client and server in the same manner. For example, the linear multiplication of an input to a neuron with a learned weight associated with the neuron may be performed on the client. Similarly, the addition of a bias to the product of the input and weight may be performed on the client. The result of the client-side operation, which may be described as an intermediate result, is communicated to the server, where a non-linear activation function may be performed on the intermediate result to produce an output from the neuron. Thus, the client portion of the neural network and the server portion of the neural network work together to generate the final output from a single neural-network layer.

In aspects, the parameters (e.g., weight and bias) used in the linear operations are encrypted at the server before deployment to the client. The encryption prevents the learned parameters from being accessed at the client. If the parameters were not encrypted, the parameters could be used by a different entity as a starting point to train their own model or simply to build their own model without training.

In aspects, homomorphic encryption is used. Homomorphic encryption is a form of encryption that allows computations to be performed on encrypted data without first having to decrypt it. This means that data can be processed while it remains in an encrypted, secure state. The resulting computations are left in an encrypted form which, when decrypted, result in an output that is identical to that produced had the operations been performed on the unencrypted data.

In aspects, all numbers in a calculation are encrypted using the same homomorphic encryption method and encryption key. Thus, in the above example, the weight and bias would be encrypted at the server and communicated to the client for later use in operation on the hybrid neural network. In operation, the unencrypted input could be received at the client, sent to the server, encrypted by the server, and communicated back to the client. The encrypted weight, bias, and input may be used by the client-side neural network to produce an encrypted result. The encrypted result of the linear operations may be communicated to the server and decrypted to form a decrypted result. The decrypted result may be provided to an activation function on the server to produce a neuron result. The neuron result is then encrypted and communicated to the client for use as an input to the next partial client-side layer in the neural network.

In aspects, some layers of a neural network may be deployed entirely on the client-side or entirely on the server-side. For example, layers that only include nonlinear functions may be maintained entirely on the server. Similarly, layers that only include linear functions may be deployed on the client.

The technologies herein are described using key terms wherein definitions are provided. However, the definitions of key terms are not intended to limit the scope of the technologies described herein.

As used herein, a linear operation, also known as a linear operator, may be a mapping between two vector spaces that is compatible with their linear structures. More precisely, a mapping T from a vector space X to a vector space Z is called a linear operator if for all vectors x and y in X and any scalar α, the following two conditions hold:

$$T(x+y)=T(x)+T(y)$$

$$T(\alpha x)=\alpha T(x)$$

These properties ensure that the operation preserves the operations of vector addition and scalar multiplication, which are fundamental to the structure of a vector space. Linear operators can be represented by matrices, which can form the basis of some operations within a neural network.

As used herein, a non-linear operation is an operation that does not fit the definition of a linear operation.

A "language model" is a set of statistical or probabilistic functions that performs Natural Language Processing (NLP) in order to understand, learn, and/or generate human natural language content. A language model is one example of a neural network. For example, a language model can be a tool that determines the probability of a given sequence of words occurring in a sentence (e.g., via NSP or MLM) or natural language sequence. Simply put, it can be a tool which is trained to predict the next word in a sentence. A language model is called a large language model ("LLM") when it is trained on enormous amount of data. Some examples of LLMs are GOOGLE's BERT and OpenAI's GPT-2 and GPT-3. GPT-3, and GPT-4, which has over 175 billion parameters trained on over 570 gigabytes of text. These models have capabilities ranging from writing a simple essay to generating complex computer codes—all with limited to no supervision. Accordingly, an LLM is a deep neural network that is very large (billions to hundreds to trillions of parameters) and understands, processes, and produces human natural language by being trained on massive amounts of text. These models can predict future words in a sentence letting them generate sentences similar to how humans talk and write. In some embodiments, the LLM is pre-trained (e.g., via NSP and MLM on a natural language corpus to learn English) without having been fine-tuned, but rather uses prompt engineering/prompting/prompt learning using one-shot or few-shot examples.

A language model may perform various tasks, such as machine translation, natural language summary, question answering, and sentiment analysis. A "natural language summary" as described herein refers to text summarization. Text summarization (or automatic summarization or NLP text summarization) is the process of breaking down text (e.g., several paragraphs) into smaller text (e.g., one sentence or paragraph). In other words, text summarization is the process of distilling the most important information from a source (or sources) to produce an abridged version for a particular user (or users) and task (or tasks). This method extracts vital information while also preserving the meaning of the text. This reduces the time required for grasping lengthy pieces such as articles without losing vital information, for example. For example, using extraction summarization, some embodiments, using NLP, detect key chunks of natural language text, extracting or cutting them out, then stitching them back together to create a shortened form of the dataset. For instance, a sentence in the dataset may read, "I'm heading to the supermarket by taking Ray road. Hopefully there will not be as much traffic at that time. I'm going to buy fruit." Extraction summarization may work by reducing the characters to "I'm heading to the supermarket. I'm going to buy fruit." In another example, abstractive summarization works by generating new sentences (or other natural language characters) from the original dataset. For example, using the original dataset described above, the summarization may be, "I'm heading to the store to buy fruit," where "store" is a new word input into the new sentence (e.g., based on NLP semantic analysis and/or Named Entity Recognition NER and "I'm going" is removed from the original sentence. NER is an information extraction technique that identifies and classifies tokens/words or "entities" in natural language text into predefined categories. Such predefined categories may be indicated in corresponding tags or labels, which can be used in summaries. Entities can be, for example, names of people, specific organizations, specific locations, specific times, specific quantities, specific monetary price values, specific percentages, specific pages, and the like.

Having briefly described an overview of aspects of the technology described herein, an operating environment in which aspects of the technology described herein may be implemented is described below in order to provide a general context for various aspects.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102*b* through 102*n*; a number of data sources, such as data sources 104*a* and 104*b* through 104*n*; server 106; and network 110. Each of the components shown in FIG. 1 is implemented via any type of computing device, such as computing device 700 illustrated in FIG. 7, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 700 in FIG. 7. For instance, server 106 is provided via multiple devices arranged in a distributed environment that collectively provides the functionality described herein. Additionally, other components not shown may also be included within the distributed environment.

User devices 102*a*, 102*b*, through 102*n* can be client user devices on the client-side of operating environment 100, while server 106 can be on the server-side of operating environment 100. Server 106 can comprise server-side software designed to work in conjunction with client-side software on user devices 102*a* through 102*n* so as to implement any combination of the features and functionalities discussed in the present disclosure. In one aspect, the server hosts a partial neural network that cooperates with partial neural networks 103*a*, 103*b*, through 103*n* to provide a response to an input. The partial neural networks 103*a*, 103*b*, through 103*n* may include encrypted parameters. In aspects, the user devices 102*a* through 102*n* provide a user interface to the hybrid neural network environment 200. The user interface may facilitate reception of user input, such as a natural language prompt, query, and/or image. The user interface may also provide a final output generated by the combined efforts of the server-side and client-side partial neural networks. The interfaces may be generated in combination with functions provided by partial neural networks

103*a*, 103*b*, through 103*n*. This division of operating environment 100 is provided to illustrate one example of a suitable environment, and there is no requirement for each implementation that any combination of server 106 and user devices and 102*a* through 102*n* remain as separate entities.

In some embodiments, user devices 102*a* through 102*n* comprise any type of computing device capable of use by a user. For example, in one embodiment, user devices 102*a* through 102*n* are the type of computing device 700 described in relation to FIG. 7. By way of example and not limitation, a user device is embodied as a personal computer (PC), a laptop computer, a mobile device, a smartphone, a tablet computer, a virtual-reality (VR) or augmented-reality (AR) device or headset, a handheld communication device, an embedded system controller, a consumer electronic device, a workstation, any other suitable computer device, or any combination of these delineated devices.

In some embodiments, data sources 104*a* and 104*b* through 104*n* comprise data sources and/or data systems, which are configured to make data available to any of the various constituents of operating environment 100 or environment 200 described in connection to FIG. 2. The data sources may include training data for the training server 108 or model trainer and/or input and output from a trained model. The training server 108 may train a neural network before it is deployed to a client device and server. Certain data sources 104*a* and 104*b* through 104*n* are discrete from user devices 102*a* through 102*n* and server 106 or are incorporated and/or integrated into at least one of those components. In one embodiment, one or more of data sources 104*a* and 104*b* through 104*n* comprise one or more sensors, which are integrated into or associated with one or more of the user device(s) 102*a* through 102*n* or server 106. For example, the data sources could include a web camera used to interact with a virtual environment.

Figure 2:
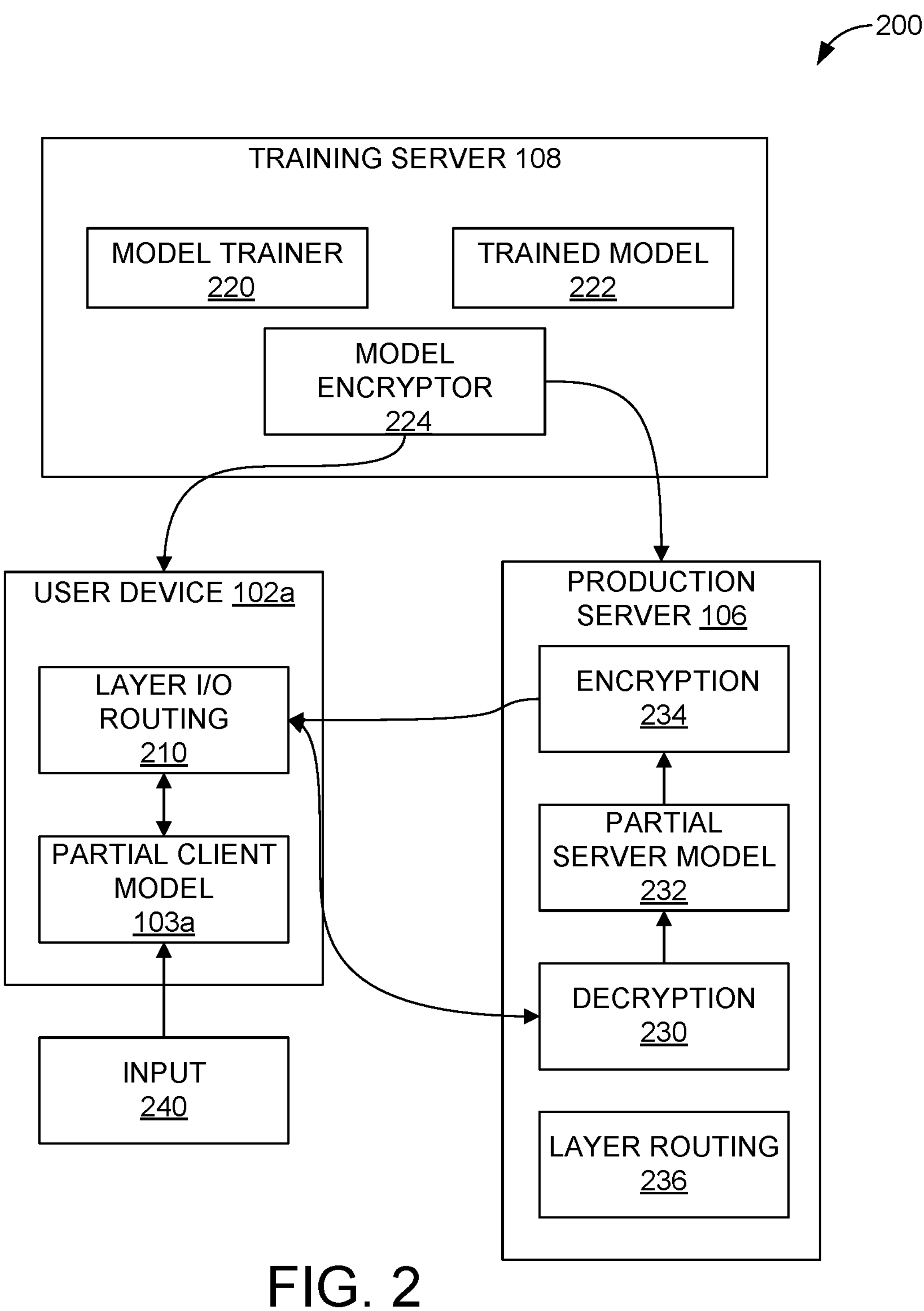
FIG. 2 is a block diagram of an example operating environment for a hybrid machine-learning model, in accordance with an aspect of the technology described herein.

Operating environment 100 can be utilized to implement one or more of the components of environment 200, as described in FIG. 2. Operating environment 100 can also be utilized for implementing aspects of methods 400, 500, and 600 in FIGS. 4, 5, and 6, respectively.

Referring now to FIG. 2 with FIG. 1, a block diagram is provided showing aspects of an example hybrid neural network environment suitable for implementing some embodiments of the disclosure and designated generally as environment 200. The environment 200 includes the training server 108, the user device 102*a*, and the production server 106. Working together, the partial neural network 103*a* and partial server model 232 may generate a response to input 240.

The environment 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. These components may be embodied as a set of compiled computer instructions or functions, program modules, computer software services, or an arrangement of processes carried out on one or more computer systems.

In one embodiment, the functions performed by components of environment 200 are associated with training and using a face editing model. These components, functions performed by these components, and/or services carried out by these components may be implemented at appropriate abstraction layer(s) such as the operating system layer, application layer, and/or hardware layer of the computing system(s). Alternatively, or in addition, the functionality of these components, and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example environment 200, it is contemplated that in some embodiments functionality of these components can be shared or distributed across other components and/or computer systems.

By way of overview, the training server 108 generates a trained model 222. The learned parameters of the model that are to be deployed to the user device 102*a* are first encrypted by the model encryptor 224. Once encrypted, a partial neural network 103*a* is constructed and communicated to the user device 102*a* for subsequent use. A non-encrypted portion of the trained model may be deployed to a production server 106. The non-encrypted portion may be described as the partial server model 232.

Once deployed, the hybrid model may process an input 240 to generate a result. In one aspect, the input is communicated from the user device 102*a* to the production server 106 for processing. In aspects, the input is not initially encrypted on the user device 102*a* and does not need to be decrypted. The partial server model 232 may process the input to generate an initial encrypted input. In an aspect, the partial server model 232 may include an embedding component that generates an embedding vector for the input and then encrypts the embedding vector using encryption component 234. This may form the initial input to the first layer of the partial neural network 103*a*. As mentioned, the key used by the encryption component 234 two encrypted initial input should match the encryption key used to encrypt the learned parameters of the first layer of the partial neural network 103*a* being used to process the initial input.

The layer input/output routing component 210 routes the layer outputs from the partial neural network 103*a* to the decryption component 230 and/or the partial server model 232. The I/O routing component 210 may identify a partial layer that generated an encrypted intermediate output being communicated to the production server 106. The layer routing component 236 may use this identification information to route the encrypted intermediate output to the correct partial layer within the partial server model 232. As described, the encrypted intermediate output may first be decrypted.

The encryption process used by the model encryptor 224, decryption component 230, and encryption component 234 be homomorphic. The key used to encrypt the parameters may be associated with the user device and communicated to the decryption component 230 and/or the encryption component 234. In an aspect, the same encryption key is used across all layers of the partial model and for encrypting input to the client-side layers. Alternatively, a different key may be used on a layer-by-layer basis. In this case, the key usage is tracked on a layer-by-layer basis and used to decrypt output from the client-side layers on a layer-by-layer basis. Similarly, the encryption key used to encrypt an output from a partial server-side layer, which may form the input to the next client-side layer, may be matched to the layer processing the output. The same key used to encrypt the learned parameters on the client-side partial layer may be used to encrypt the input to the same client-side partial layer.

The ability to perform mathematical operations on encrypted data means that there needs to be a relationship between plaintexts and ciphertexts. It needs to be possible to add or multiply two ciphertexts together and have the result be the same as performing the same operation on the two plaintexts and then encrypting it. At the same time, this relationship needs to be implemented in such a way that it's hidden from an observer. If watching mathematical operations on ciphertexts reveals information about the corresponding plaintexts, then the encryption is broken. In aspects, the technology described herein may use fully homomorphic encryption. A fully homomorphic encryption algorithm allows an infinite number of additions or multiplications of ciphertexts while still producing a valid result.

In aspects, the technology described herein may use somewhat homomorphic encryption. A somewhat homomorphic encryption algorithm allows a finite number of any operation rather than an infinite number of a particular operation. For example, a somewhat homomorphic encryption algorithm may be able to support any combination of up to five additions or multiplications. However, a sixth operation of either type would create an invalid result. Nevertheless, this may be desirable, in some implementations, especially if it is desirable to use a layer-by-layer approach to encryption keys.

In aspects, the technology described herein may use partially homomorphic encryption algorithms. Partially homomorphic encryption algorithms allow a certain operation to be performed an infinite number of times. For example, a particular algorithm may be additively homomorphic, meaning that adding two ciphertexts together produces the same result as encrypting the sum of the two plaintexts The model trainer 220 of the training server 108 generates a trained model 222. For the sake of illustration, the model trainer 220 may train a Large Language Model (e.g., a BERT model or GPT-4 model) that uses particular inputs to make particular predictions (e.g., generate answers), according to some embodiments. In some embodiments, this model represents or includes the functionality as described with respect to the trained model 222, partial neural network 103*a* and/or partial server model 232.

First, a natural language corpus (e.g., various WIKIPEDIA English words or BooksCorpus) of the inputs are converted into tokens and then feature vectors and embedded into an input embedding to derive meaning of individual natural language words (for example, English semantics) during pre-training. In some embodiments, to understand English language, corpus documents, such as text books, periodicals, blogs, social media feeds, and the like are ingested by the language model.

In some embodiments, each word or character in the input(s) is mapped into the input embedding in parallel or at the same time, unlike existing long short-term memory (LSTM) models, for example. The input embedding maps a word to a feature vector representing the word. But the same word (for example, "apple") in different sentences may have different meanings (for example, phone v. fruit). This is why a positional encoder can be implemented. A positional encoder is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$PE_{(pos,2i)} = \sin\left(pos/10000^{(2i/d_{model})}\right)$$

$$PE_{(pos,2i+1)} = \cos\left(pos/10000^{(2i/d_{model})}\right)$$

After passing the input(s) through the input embedding and applying the positional encoder, the output is a word embedding feature vector, which encodes positional information or context based on the positional encoder. These word embedding feature vectors are then passed to the encoder and/or decoder block(s), where it goes through a multi-head attention layer and a feedforward layer.

The multi-head attention layer is generally responsible for focusing or processing certain parts of the feature vectors representing specific portions of the input(s) by generating attention vectors. For example, in Question Answering systems, the multi-head attention layer determines how relevant the ith word (or particular word in a sentence) is for answering the question or relevant to other words in the same or other blocks, the output of which is an attention vector. For every word, some embodiments generate an attention vector, which captures contextual relationships between other words in the same sentence or other sequence of characters. For a given word, some embodiments compute a weighted average or otherwise aggregate attention vectors of other words that contain the given word (for example, other words in the same line or block) to compute a final attention vector.

In some embodiments, a single headed attention has abstract vectors Q, K, and V that extract different components of a particular word. These are used to compute the attention vectors for every word, using the following formula:

$$Z = \text{softmax}\left(Q.K^T/\sqrt{\text{Dimension of vector } Q, K \text{ or } V}\right).V$$

For multi-headed attention, there a multiple weight matrices Wq, Wk and Wv. so there are multiple attention vectors Z for every word. However, a neural network may only expect one attention vector per word. Accordingly, another weighted matrix, Wz, is used to make sure the output is still an attention vector per word. In some embodiments, after the layers and, there is some form of normalization (for example, batch normalization and/or layer normalization) performed to smoothen out the loss surface making it easier to optimize while using larger learning rates.

The LLM may include residual connection and/or normalization layers where normalization re-centers and rescales or normalizes the data across the feature dimensions. The feedforward layer is a feed forward neural network that is applied to every one of the attention vectors outputted by the multi-head attention layer. The feedforward layer transforms the attention vectors into a form that can be processed by the next encoder block or making a prediction. For example, given that a document includes first natural language sequence "the due date is . . . " the encoder/decoder block(s) predicts that the next natural language sequence will be a specific date or particular words based on past documents that include language identical or similar to the first natural language sequence.

In some embodiments, the initial embedding (for example, the input embedding) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence number (that includes the input(s)) that is encoded into a vector (for example, first sentence, second sentence, etc. assuming a top-down and right-to-left approach). The position embeddings are vectors that represent the position of a particular word in such sentence that can be produced by positional encoder. When these three embeddings are added or concatenated together, an embedding vector is generated that is used as input into the encoder/decoder block(s). The segment and position embeddings are used for temporal ordering since all of the vectors are fed into the encoder/decoder block(s) simultaneously and language models need some sort of order preserved.

In some embodiments, once pre-training is performed, the encoder/decoder block(s) performs prompt engineering (fine-tuning or prompt-tuning) and/or zero-shot learning on a variety of QA (e.g., prompt and output) data sets by converting different QA formats into a unified sequence-to-sequence format. For example, some embodiments perform the QA task by adding a new question-answering head or encoder/decoder block, just the way a masked language model head is added (in pre-training) for performing a MLM task, except that the task is a part of prompt engineering, zero-shot learning, prompt-tuning, and/or fine-tuning. This includes the encoder/decoder block(s) processing the inputs (i.e., the target datasets and the prompt instructions) in order to make the predictions and confidence scores. Prompt engineering, in some embodiments, is the process of crafting and optimizing text prompts for language models to achieve desired outputs. In other words, prompt engineering is the process of mapping prompts (e.g., an instruction/question) to the output (e.g., an answer) that it belongs to for training. For example, if a user asks a model to generate a poem about a person fishing on a lake, the expectation is it will generate a different poem each time. Users may then label the output or answers from best to worst. Such labels are an input to the model to make sure the model is giving a more human-like or best answers, while trying to minimize the worst answers (e.g., via reinforcement learning). In some embodiments, a "prompt" as described herein includes one or more of: a request (e.g., a question or instruction (e.g., write a summary of a poem)), one or more datasets, a command or instruction, code snippets, mathematical equations, and/or one or more examples (e.g., one-shot or two-shot examples). The "prompt instructions" as included in the inputs can include any of the instructions as described herein. Once trained through the above method, different method, or variation, the trained model 222 is saved and then deployed in a hybrid fashion, as described, partially, in FIG. 3.

Figure 3:
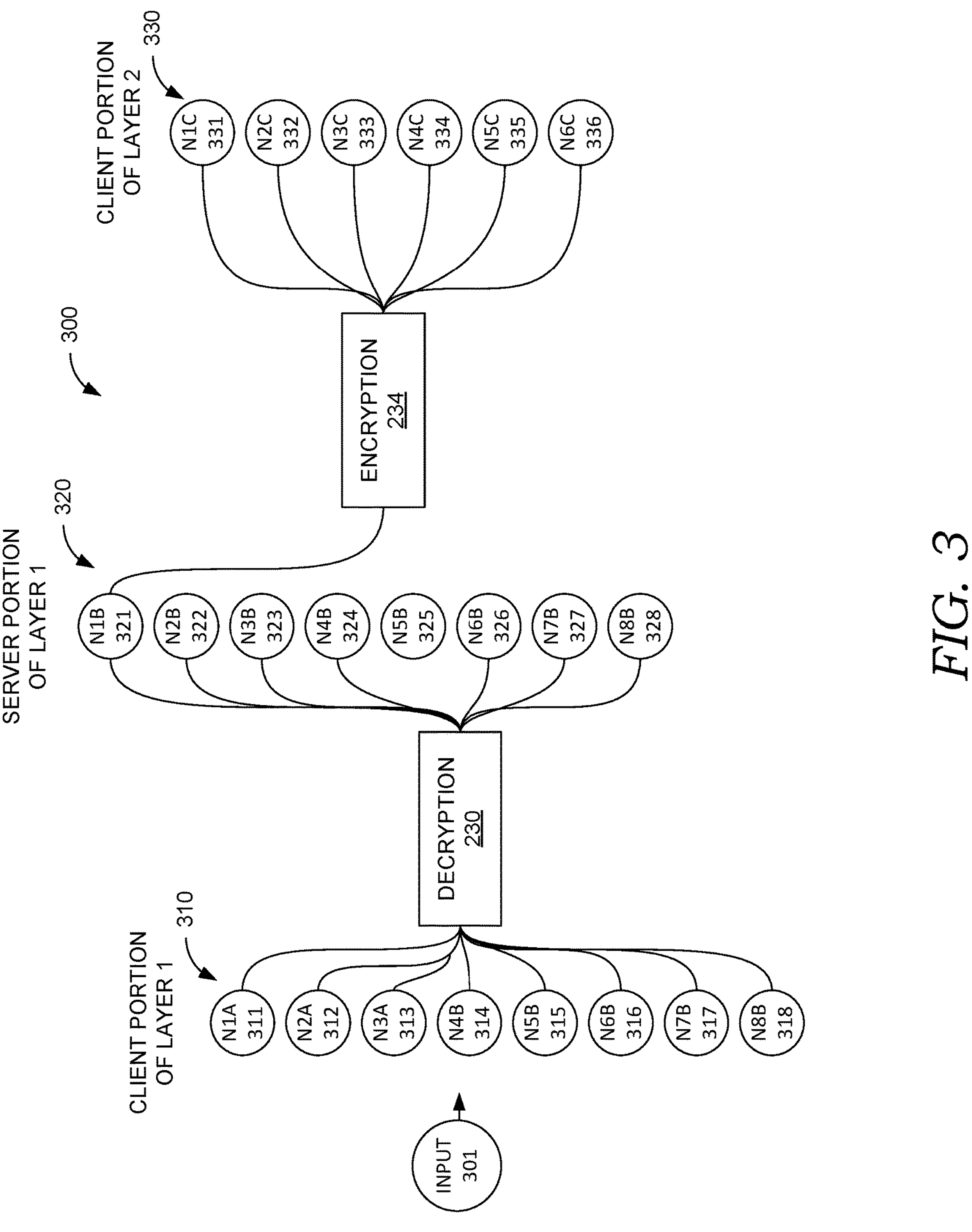
FIG. 3 is a block diagram of an example hybrid neural network layer, in accordance with an aspect of the technology described herein.

Turning now to FIG. 3, a first layer of a hybrid neural network 300 is illustrated, according to an aspect of the technology described herein. The hybrid neural network 300 includes three partial layers: a partial first layer on the partial client-side neural network 310, a partial first layer on the partial server-side neural network 320, and a partial second layer on the partial client-side neural network 330. The partial first layer on the client-side neural network 310 includes partial node 1A 311, partial node 2A 312, partial node 3A 313, partial node 4A 314, partial node 5A 315, partial node 6A 316, partial node 7A 317, and partial node 8A 318. Only eight neurons are shown for the sake of illustration. An actual implementation may include layers with hundreds or thousands of neurons.

Each of the nodes in the partial first layer of the partial client-side neural network 310 may include learned parameters associated with linear operations. Example linear operations include a weighting operation and a bias operation. The weighting operation multiplies a weight associated with each partial node with the input 301. The bias operation may add a bias to the result of the weight operation. In combination, the weighting operation and the bias operation may produce an intermediate result for each neuron. In combination, the intermediate result for each neuron forms an intermediate result for the partial first layer of the partial client-side neural network 310.

In an aspect, the input 301 is encrypted by the encryption component 324 of the server. The input 301 may be the result of a previous layer (not shown). The input 301 may be the result of an embedding process (not shown) or feature extraction process (not shown) performed on input to the neural network. The embedding processes or feature extraction process could occur entirely on the server, entirely on the client, or through a hybrid deployment. The input 301 could include a natural language prompt, an image, a query, and the like.

In aspects, the learned parameters associated with the nodes of the first partial layer of the partial client-side neural network 310 are encrypted by the encryption component 224, or a similar component, during a deployment of the partial neural network to the client. In an aspect, homomorphic encryption is used. Homomorphic encryption allows linear mathematical operations to be performed without decrypting the input. The same homomorphic encryption key may be used to encrypt the learned parameters and the inputs. This allows the encrypted intermediate input to be decrypted by the decryption component 230 forming a decrypted intermediate input.

Once decrypted, the decrypted intermediate input is communicated to the first partial layer on the partial server-side neural network 320. The first partial layer on the partial server-side neural network 320 includes the other half of the nodes previously described on the client-side. The nodes in the server-side may include an activation function, which is nonlinear. The partial first layer on the partial server-side neural network 320 includes partial node 1B 321, partial node 2B 322, partial node 3B 323, partial node 4B 324, partial node 5B 325, partial node 6B 326, partial node 7B 327, and partial node 8B 328. The result of the activation functions performed at each node forms the final result for the first layer. The final result may be communicated to the encryption component 234, which encrypts the final result to form an encrypted file result.

The encrypted final result is communicated to nodes in the partial second layer on the partial client-side neural network 330. The partial second layer on the partial client-side neural network 330 includes partial node 1C 331, partial node 2C 332, partial node 3C 333, partial node 4C 334, partial node 5C 335, partial node 6C 336. The partial second layer on the partial client-side neural network 330 may operate in a similar fashion as the partial first layer, as described previously.

Example Methods

Figure 4:
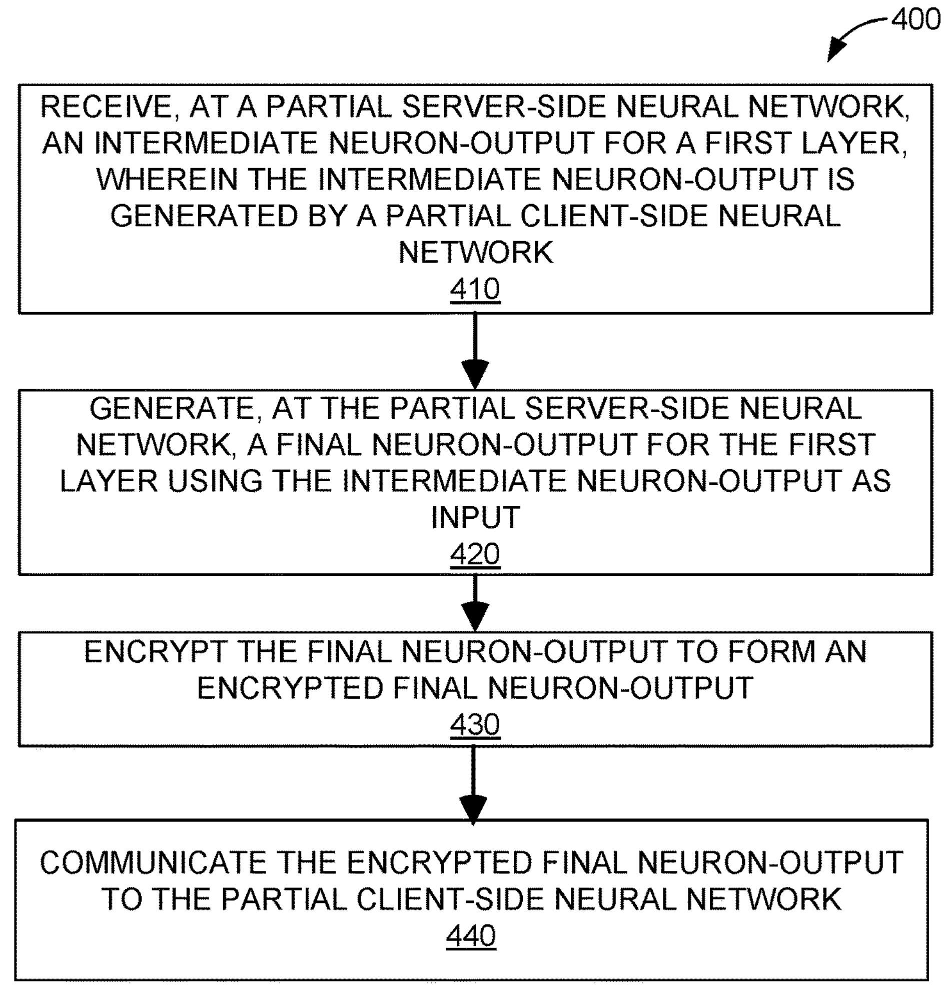
FIG. 4 is a flow diagram showing a method of using a hybrid neural network, in accordance with an aspect of the technology described herein.
Figure 5:
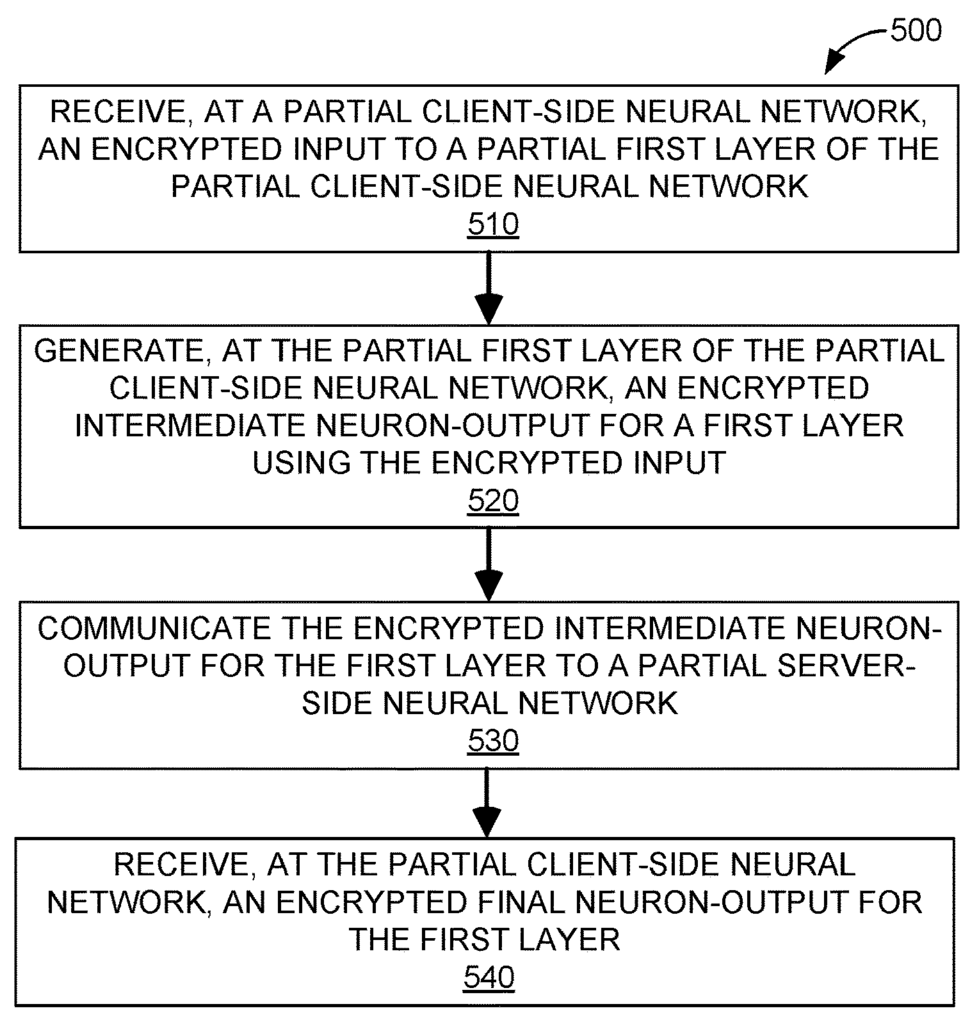
FIG. 5 is a flow diagram showing a method of using a hybrid neural network, in accordance with an aspect of the technology described herein.

Now referring to FIGS. 4, 5 and 6, each block of methods 400, 500, and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 400, 500, and 600 are described, by way of example, with respect to FIGS. 1-3. However, these methods may additionally or alternatively be executed by any one system, or any combination of systems, including, but not limited to, those described herein.

FIG. 4 is a flow diagram showing a method 400 of operating a hybrid neural network, in accordance with some embodiments of the present disclosure. Method 400 may be performed on or with systems similar to those described with reference to FIGS. 1-3. The technology described herein effectively splits operations associated with a single neuron between a server and a client. This creates a partial neuron on the client and a partial neuron on the server. Both the client-side portion and server-side portion need to cooperate to perform the functions associated with a single neuron. The cooperation includes routing the output from the client-side portion over a network to the server-side portion. The output from the server-side portion may then be routed to the next client-side portion of a subsequent layer.

At step 410, the method 400 includes receiving, at a partial server-side neural network, an intermediate neuron-output for a first layer. The intermediate neuron-output is generated by a partial client-side neural network. The intermediate neuron-output is not a final output for a neuron. In an aspect, the intermediate neuron-output represents linear operations, such as weight and bias calculations. In aspects, the parameters (e.g., weight and bias) used in the linear operations are encrypted at the server before deployment to the client. The encryption prevents the learned parameters from being accessed at the client. If the parameters were not encrypted, the parameters could be used by a different entity as a starting point to train their own model or simply to build their own model without training. Accordingly, the intermediate neuron-output may be encrypted. For example, the intermediate neuron-output may be encrypted using homomorphic encryption.

At step 420, the method 400 includes generating, at the partial server-side neural network, a final neuron-output for the first layer using the intermediate neuron-output as input. In an aspect, the final neuron-output is generated by inputting the intermediate neuron-output into a non-linear function, such as an activation function. The final neuron-output for every neuron in a layer can be combined to produce the final layer output. In aspects, the intermediate neuron-output may be decrypted prior to inputting the intermediate neuron-output to a function.

At step 430, the method 400 includes encrypting the final neuron-output to form an encrypted final neuron-output. In aspects, all numbers in a calculation are encrypted using the same homomorphic encryption method and encryption key. Thus, the weight and bias in the partial client-side neural network would be encrypted at the server and communicated to the client. In operation, the unencrypted input could be received at the client, sent to the server, encrypted by the server, and communicated back to the client. The encrypted weight, bias, and input may be used by the client-side neural network to produce an encrypted result. The encrypted result of the linear operations may be communicated to the server and decrypted to form a decrypted result. The decrypted result may be provided to an activation function on the server to produce the final neuron result.

The final neuron result is then encrypted and communicated to the client for use as an input to the next partial client-side layer in the neural network. At step 440, the method 400 includes communicating the encrypted final neuron-output to the partial client-side neural network.

FIG. 5 is a flow diagram showing a method 500 of operating a hybrid neural network, in accordance with some embodiments of the present disclosure. Method 500 may be performed on or with systems similar to those described with reference to FIGS. 1-3. In aspects, all neurons in a layer may be split between the client and server in the same manner. For example, the linear multiplication of an input to a neuron with a learned weight associated with the neuron may be performed on the client. Similarly, the addition of a bias to the product of the input and weight may be performed on the client. The result of the client-side operation, which may be described as an intermediate result, is communicated to the server, where a non-linear activation function may be performed on the intermediate result to produce an output from the neuron. Thus, the client portion of the neural network and the server portion of the neural network work together to generate the final output from a single neural-network layer.

At step 510, the method 500 includes receiving, at a partial client-side neural network, an encrypted input to a partial first layer of the partial client-side neural network. The encrypted input could be an encrypted initial input or an encrypted final neuron result from a previous layer. The unencrypted input could be received at the client, sent to the server, encrypted by the server, and communicated back to the client. In aspects, all numbers in a calculation are encrypted using the same homomorphic encryption method and encryption key.

At step 520, the method 500 includes generating, at the partial first layer of the partial client-side neural network, an encrypted intermediate neuron-output for a first layer using the encrypted input. At step 530, the method 500 includes communicating the encrypted intermediate neuron-output for the first layer to a partial server-side neural network. At step 540, the method 500 includes receiving, at the partial client-side neural network, an encrypted final neuron-output for the first layer.

FIG. 6 is a flow diagram showing a method 600 of operating a hybrid neural network, in accordance with some embodiments of the present disclosure. Method 600 may be performed on or with systems similar to those described with reference to FIGS. 1-3.

At step 610, the method 600 includes training a neural network to form a trained neural network. The model may be trained as described previously, such as with reference to FIG. 3. At step 620, the method 600 includes for a first layer of the trained neural network, encrypting neuron weights to form a plurality of encrypted weights. In aspects, all numbers in a calculation are encrypted using the same homomorphic encryption method and encryption key. Thus, the weight and/or bias in the partial client-side neural network would be encrypted at the server and communicated to the client. In operation, the unencrypted input could be received at the client, sent to the server, encrypted by the server, and communicated back to the client. The encrypted weight, bias, and input may be used by the client-side neural network to produce an encrypted result. The encrypted result of the linear operations may be communicated to the server and decrypted to form a decrypted result. The decrypted result may be provided to an activation function on the server to produce the final neuron result. At step 630, the method 600 includes generating a partial first layer of a partial client-side neural network. The partial first layer comprises the plurality of encrypted weights.

At step 640, the method 600 includes communicating the partial first layer of the partial client-side neural network to a first client device. Once deployed to the client, the partial first layer can work in conjunction with other client side and server side components to produce a result for a given input.

At step 650, the method 600 includes generating a partial first layer of a partial server-side neural network. The partial first layer comprises an activation function. In one aspect, the partial server-side neural network includes all non-linear functions of a layer, including the activation function. At step 660, the method 600 includes deploying the partial first layer of the partial server-side neural network to a production server. Once deployed to the client, the partial first layer can work in conjunction with other client side and server side components to produce a result for a given input.

Example Operating Environment

Figure 7:
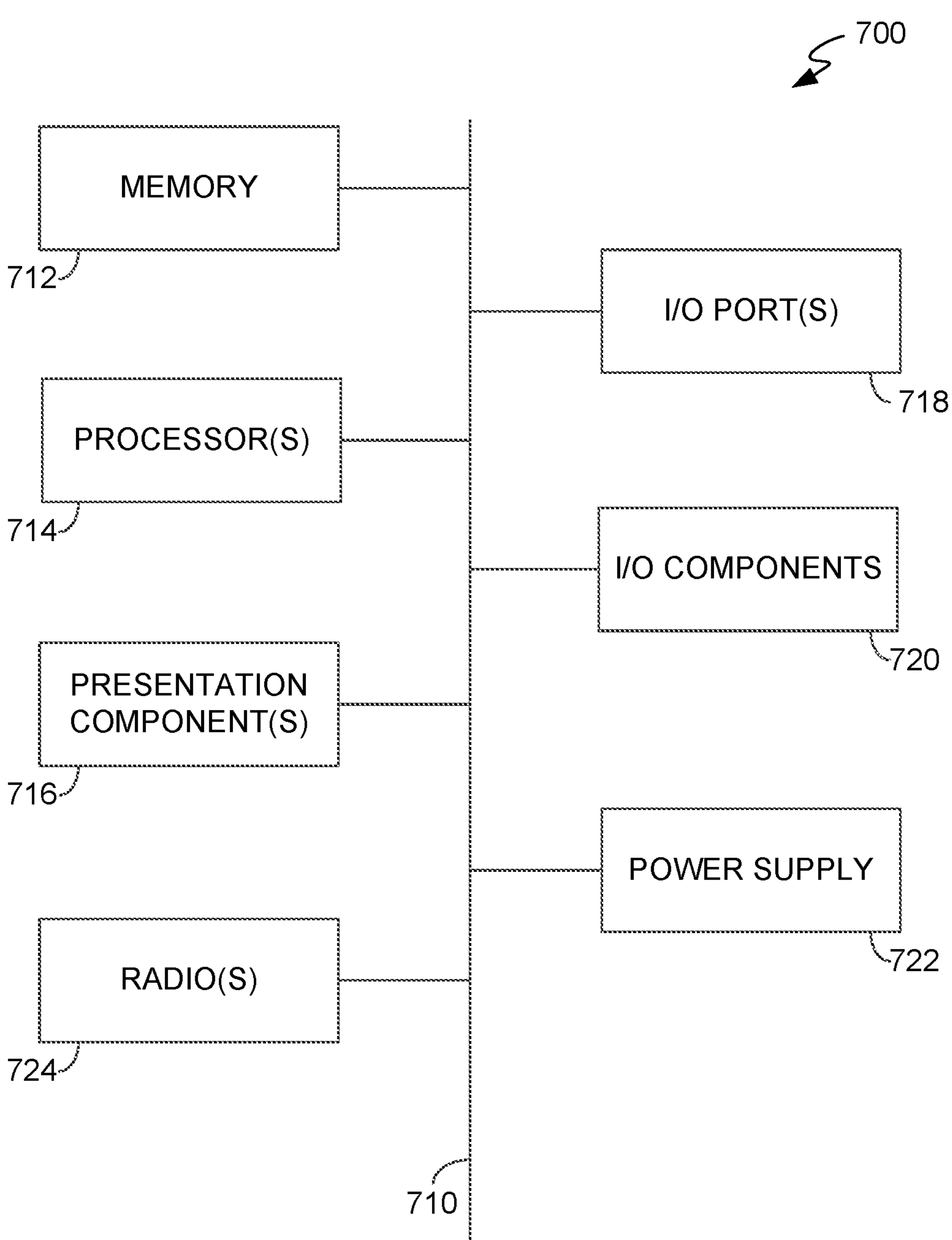
FIG. 7 is a block diagram showing a computing device suitable for implementations of the technology described herein.

Referring to the drawings in general, and initially to FIG. 7 in particular, an example operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of a computing device that may be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media may be any available media that may be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Example memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Example presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio 724. The radio 724 transmits and receives radio communications. The computing device may be a wireless terminal adapted to receive communications and media over various wireless networks. Computing device 700 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

EMBODIMENTS

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by computing device performs a method of operating a neural network in hybrid deployment, the method comprising:

receiving, at a partial server-side neural network, an intermediate neuron-output for a first layer, wherein the intermediate neuron-output is generated by a partial client-side neural network, wherein the partial client-side neural network executes only linear operations comprising weighting and bias operations of the first layer to produce the intermediate neuron-output;

generating, at the partial server-side neural network, a final neuron-output for the first layer using the intermediate neuron-output as input, wherein the partial server-side neural network executes only non-linear activation operations of the first layer;

encrypting the final neuron-output to form an encrypted final neuron-output; and communicating the encrypted final neuron-output to the partial client-side neural network.

2. The media of claim 1, wherein the method further comprises receiving an encrypted intermediate neuron-output for the first layer and decrypting the encrypted intermediate neuron-output to form the intermediate neuron-output.

3. The media of claim 1, wherein the encrypted final neuron-output is encrypted with homomorphic encryption.

4. The media of claim 1, wherein learned parameters of the partial client-side neural network remain homomorphically encrypted during generation of the intermediate neuron-output.

5. The media of claim 4, wherein the client-side neural network lacks a decryption key for the learned parameters.

6. The media of claim 1, wherein the intermediate neuron-output is produced using linear operations with homomorphically encrypted inputs and homomorphically encrypted learned parameters.

7. The media of claim 1, wherein the method further comprises routing the intermediate neuron-output to a partial first layer of the partial server-side neural network.

8. The media of claim 1, wherein method further comprises receiving a natural language prompt from the partial client-side neural network.

9. A method of operating a neural network in hybrid deployment, the method comprising:

receiving, at a partial server-side neural network, a homomorphically encrypted intermediate neuron-output for a first layer, wherein the intermediate neuron-output is generated by a partial client-side neural network, wherein the partial client-side neural network executes only linear operations comprising weighting and bias operations of the first layer to produce the homomorphically encrypted intermediate neuron-output;

decrypting, at a partial server-side neural network, the encrypted intermediate neuron-output to form an intermediate neuron-output;

routing the intermediate neuron-output to a partial first layer of the partial server-side neural network;

generating, at the partial server-side neural network, a final neuron-output for the first layer using the intermediate neuron-output as input, wherein the partial server-side neural network executes only non-linear activation operations of the first layer;

encrypting the final neuron-output to form an encrypted final neuron-output; and communicating the encrypted final neuron-output to the partial client-side neural network.

10. The method of claim 9, wherein the encrypted final neuron-output corresponds to the same layer for which the intermediate neuron-output was generated.

11. The method of claim 9, wherein the partial server-side neural network does not execute any linear weighting or bias operations of the first layer.

12. The method of claim 9, wherein learned parameters of the partial client-side neural network remain homomorphically encrypted during generation of the homomorphically encrypted intermediate neuron-output.

13. The method of claim 12, wherein the client-side neural network lacks a decryption key for the learned parameters.

14. The method of claim 12, wherein the intermediate neuron-output is produced using linear operations with homomorphically encrypted inputs and homomorphically encrypted learned parameters.

15. The method of claim 14, wherein neither the homomorphically encrypted inputs nor the learned parameters are decrypted at the client device.

16. One or more computer storage media comprising computer-executable instructions that when executed by computing device performs a method of operating a neural network in hybrid deployment, the method comprising:

receiving, at a partial server-side neural network, an intermediate neuron-output for a first layer, wherein the intermediate neuron-output is generated by a partial client-side neural network, wherein the partial client-side neural network executes only linear operations comprising weighting and bias operations of the first layer to produce the intermediate neuron-output;

generating, at the partial server-side neural network, a final neuron-output for the first layer using the intermediate neuron-output as input, wherein the partial server-side neural network executes only non-linear activation operations of the first layer;

encrypting the final neuron-output to form an encrypted final neuron-output, wherein the encrypted final neuron-output is encrypted with homomorphic encryption; and communicating the encrypted final neuron-output to the partial client-side neural network.

17. The media of claim 16, wherein the method further comprises receiving an encrypted intermediate neuron-output for the first layer and decrypting the encrypted intermediate neuron-output to form the intermediate neuron-output.

18. The media of claim 16, wherein learned parameters of the partial client-side neural network remain homomorphically encrypted during generation of the homomorphically encrypted intermediate neuron-output.

19. The media of claim 18, wherein the client-side neural network lacks a decryption key for the learned parameters.

20. The media of claim 16, wherein method further comprises training a neural network to form a trained neural network;

for a first layer of the trained neural network, encrypting neuron weights to form a plurality of encrypted weights;

generating a partial first layer of the partial client-side neural network, wherein the partial first layer comprises the plurality of encrypted weights;

communicating the partial first layer of the partial client-side neural network to a first client device;

generating a partial first layer of the partial server-side neural network, the partial first layer comprising an activation function; and deploying the partial first layer of the partial server-side neural network to a production server.

* * * * *